(12) United States Patent
Cabrera et al.

(10) Patent No.: US 6,535,998 B1
(45) Date of Patent: Mar. 18, 2003

(54) SYSTEM RECOVERY BY RESTORING HARDWARE STATE ON NON-IDENTICAL SYSTEMS

(75) Inventors: Luis Felipe Cabrera, Bellevue, WA (US); Kartik N. Raghavan, Seattle, WA (US); Glenn A. Thompson, Redmond, WA (US); Wesley Witt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/361,481

(22) Filed: Jul. 26, 1999

(51) Int. Cl.[7] .................................................. H02H 3/05
(52) U.S. Cl. ............................................. 714/15; 714/2
(58) Field of Search .............................. 714/15, 2, 3, 7, 714/16, 20

(56) References Cited

U.S. PATENT DOCUMENTS

| | | | |
|---|---|---|---|
| 4,979,107 A | * 12/1990 | Advani et al. ............... 710/100 |
| 5,193,174 A | * 3/1993 | Bealkowski et al. ......... 710/104 |
| 5,469,573 A | * 11/1995 | McGill, III et al. ......... 395/712 |
| 5,615,330 A | * 3/1997 | Taylor ........................... 714/7 |
| 5,745,669 A | * 4/1998 | Hugard et al. ................. 714/3 |
| 5,799,147 A | * 8/1998 | Shannon ........................ 714/6 |
| 5,907,672 A | * 5/1999 | Matze et al. ................... 714/8 |

* cited by examiner

Primary Examiner—Dieu-Minh Le
(74) Attorney, Agent, or Firm—Law Offices of Albert S. Michalik, PLLC

(57) ABSTRACT

A method and system for recovering from a system failure wherein the failed system is restored to a new system that has different hardware. Hardware state is preserved during a backup process, and following a failure, a restore is performed to the extent possible using that hardware state but on a system having a different hardware configuration. Rules are provided for handling the differences through selective merging, arranging, and replacement of data, with the logic and work performed transparently to the user. Hardware state includes hard disk configuration information, the location (partition) of the operating system, devices installed on the system and any additional drivers to load. When restored, for hardware that is identical, the hardware state is restored as specified in the file. If the hardware state is not identical, then a set of rules are used to restore the hardware state. Via these rules, hard disks may be restored to differently sized or a different number of hard disks, disk mirror pairs may be handled appropriately, and so on. Critical devices that are required to restore the system are merged as necessary during the restore process, while new or different non-critical devices are preserved during the restore process for future use. Updated drivers may be used.

34 Claims, 13 Drawing Sheets

```
[VERSION]
Signature="$Windows NT$"
Provider="NtBackup V5.0"

[SYSTEMS]
1=CRISTIAT-TST,"5.0","C:\WINNT"

[InstallFiles]

[NtBackup.RecoveryMedia]
1=1,1,2,,,,"Q:\Backup.bkf"

[COMMANDS]
1=1,3000,0,ASR_FMT,recover
2=1,5000,1,NtBackup,"Recover /1"
3=1,2000,1,dmrecovr,"restore"
4=1,2000,1,ftasr,"restore"
5=1,200,1,cmd,""
6=1,4000,1,cmd,""

[DISKS]
1=1,0,0xf6f11634,512,17783240
2=1,1,0xd19ce81d,512,4194058
3=1,2,0xed075dc7,512,4194058
4=1,3,0xed075dc6,512,8388315
5=1,4,0xd19ce81c,512,4419464

[PARTITIONS]
1=1,0,"\??\Volume{5dd1a~~~-9b76-00a5}",0x0,0x7,63,17767827
2=2,3,"\??\Volume{0f055e~~~d6172696f}",0x80,0x7,63,3068352
3=3,0,,0x0,0x42,63,4192902
4=4,0,,0x0,0x42,63,8385867
5=5,0,,0x0,0x42,63,4417812
```

[VOLUMES]
1=1,"\??\Volume{0f055eb4-eb6e-11d2-b895-806d6172696f}",
"\Dos Devices\C:",NTFS,,0x800
2=1,"\??\Volume{5dd1a967-ebb4-11d2-9b76-00a0c9063765}",
"\Dos Devices\Q:",NTFS,Backup,0x1000
3=1,"\??\Volume{5dd1a969-ebb4-11d2-9b76-00a0c9063765}",
"\Dos Devices\V:",NTFS,Spanned,0x400
4=1,"\??\Volume{5dd1a96b-ebb4-11d2-9b76-00a0c9063765}",
"\Dos Devices\S:",NTFS,Stripe,0x400
5=1,"\??\Volume{5dd1a96d-ebb4-11d2-9b76-00a0c9063765}",
"\Dos Devices\P:",NTFS,RAID-5,0x400
6=1,"\??\Volume{5dd1a96f-ebb4-11d2-9b76-00a0c9063765}",
"\Dos Devices\M:",NTFS,Mirror,0x400

[RemovableDisks]
1=1,"\Device\CdRom0","\??\Volume{31691342-eb70-11d2-
    9b75-806d6172696f}","\DosDevices\D:"
2=1,"\Device\Floppy0","\??\Volume{31691343-eb70-11d2-
    9b75-806d6172696f}","\DosDevices\A:"

[LDM.VolumeState]
  1852, 59,"LDM
Configuration","Microsoft1","31691341-eb70-11d2-9b75
    -806d6172696f"
"Group","e79bc5a0-ebb4-11d2-9b76-00a0c9063765","
Cristiat-tstDg0","primary","0.1095"
"Disk","Disk1","Active","-318284345","e79bc5a1-~~~5&0&030"
"Disk","Disk2","Active","-318284346","e79bc5a2-~~~5&0&040"
"Disk","Disk3","Active","-778246116","e79bc5a3-~~~5&0&050"
"Volume","2a0b4281-~~~","Mirror","184~~~b76-00a0c9063765}"
"Plex","Volume1-01","Span"

```
"Subdisk","Disk1-01","819200","0","0","Disk1","0"
"Subdisk","Disk2-01","614400","0","819200","Disk2","0"
"Subdisk","Disk3-01","409600","0","1433600","Disk3","0"
"Volume","61ab66d0-ebb5-11d2-9b76-00a0c9063765","Mirror",
"1843200","","0x7","","{5dd1a96b-ebb4-1~~~6-00a0c9063765}"
"Plex","Stripe1-01","Stripe","3","128"
"Subdisk","Disk1-02","614400","0","0","Disk1","819200"
"Subdisk","Disk2-02","614400","1","0","Disk2","614400"
"Subdisk","Disk3-02","614400","2","0","Disk3","409600"
"Volume","92b61350-ebb5-11d2-9b76-00a0c9063765","Raid-5",
"1638400","","0x7","","{5dd1a96d-ebb4-1~~~6-00a0c9063765}"
"Plex","Raid1-01","Raid-5","3","128"
"Subdisk","Disk1-03","819200","0","0","Disk1","1433600"
"Subdisk","Disk2-03","819200","1","0","Disk2","1228800"
"Subdisk","Disk3-03","819200","2","0","Disk3","1024000"
"Volume","061c5f40-ebb6-11d2-9b76-00a0c9063765","Mirror",
"1228800","","0x7","","{5dd1a96f-ebb4-1~~~6-00a0c9063765}"
"Plex","Volume2-01","Span"
"Subdisk","Disk1-04","1228800","0","0","Disk1","2252800"
"Plex","Volume2-02","Span"
"Subdisk","Disk2-04","1228800","0","0","Disk2","2048000"

[FT.VolumeState]
0
```

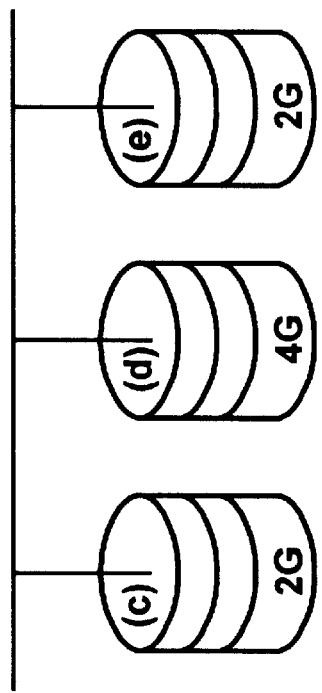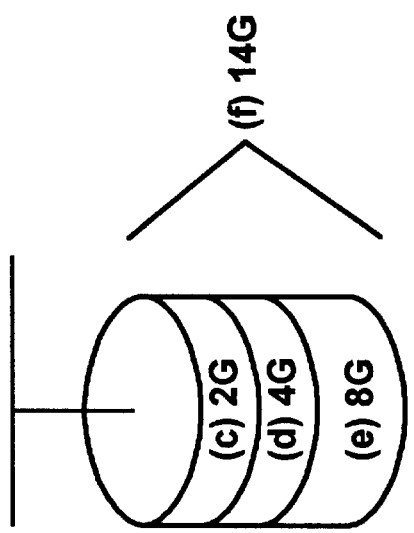
FIG. 9
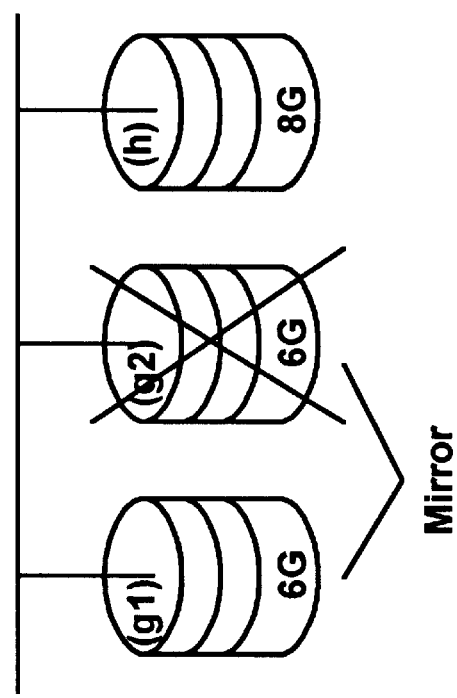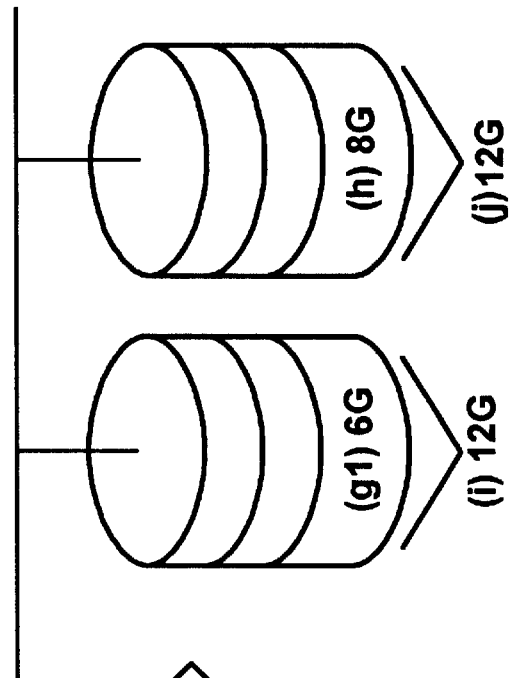
FIG. 10

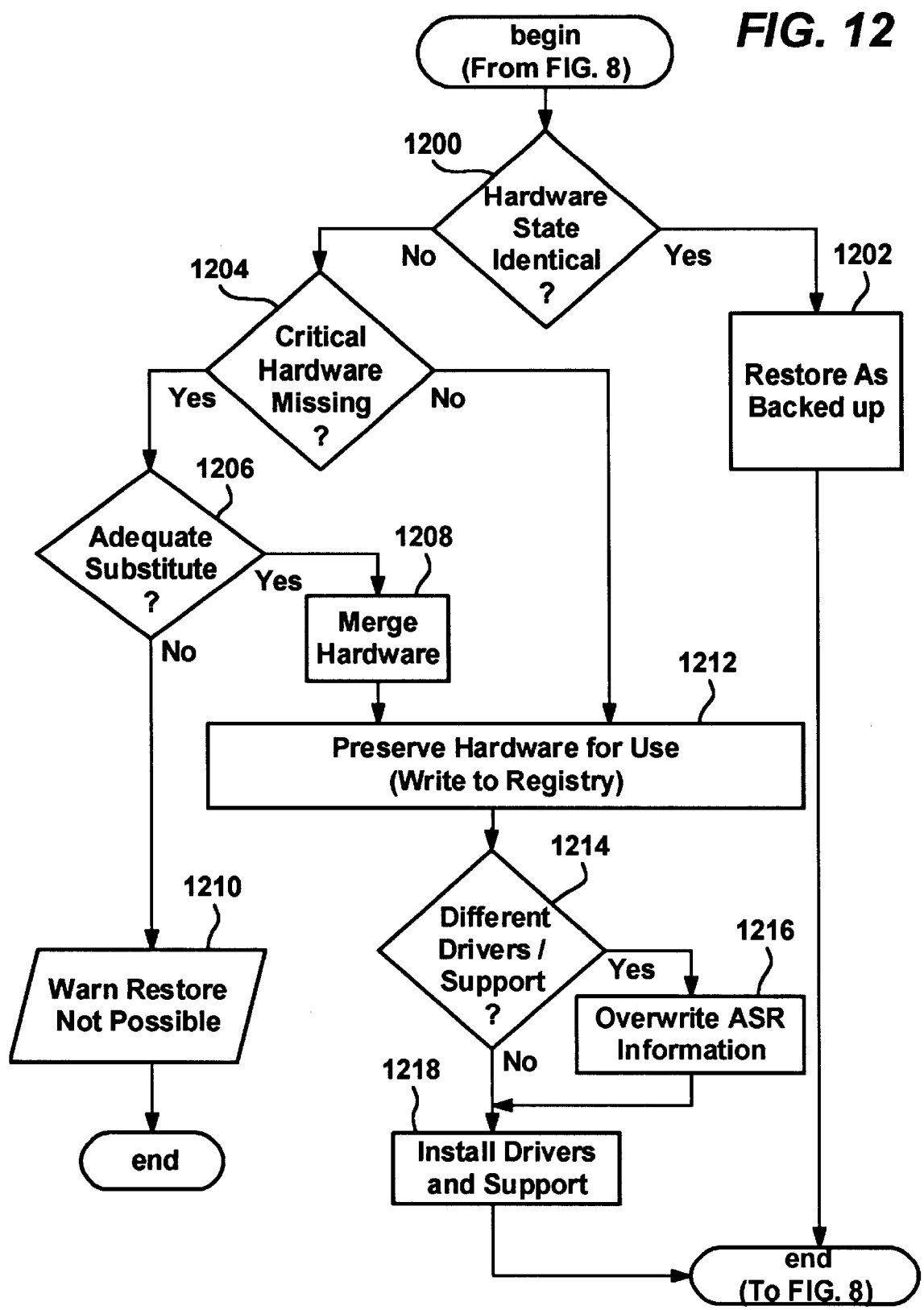

SYSTEM RECOVERY BY RESTORING HARDWARE STATE ON NON-IDENTICAL SYSTEMS

FIELD OF THE INVENTION

The present invention is directed generally to computer systems, and more particularly to recovering from the failure of a computer system.

BACKGROUND OF THE INVENTION

Computer systems are protected against failure by backing up the computer data, whereby if a system crashes, the data may be restored. However, if a computer system fails in a manner in which it cannot reboot, the data cannot be simply restored. For example, hardware may fail, (e.g., the hard disk controller burns out), or software may fail, (e.g., a virus corrupts some key files and/or data), in a manner that prevents a reboot. However, in the event of a system failure, computer users not only want their data restored, but want their system restored to the way it was prior to the failure.

At present, backing up system information so as to enable a system to be restored to a bootable state, involves the use of many disjoint and separate programs and operations. For example, a system administrator may use one or more utility programs to determine the state of disk configuration and/or formats so that the disk information may be saved. Additional programs and techniques may be used to record a list of operating system files, data, and other software installed on the system. The administrator may also record the types of various devices and settings thereof installed in a system. Backing up a system's state is thus a formidable task.

Similarly, the process of restoring a system involves the use of this recorded information, along with an operating system setup program, thus making restoration a complicated process. Moreover, if the original system is replaced with non-identical hardware, (e.g., a larger disk, a new CD-ROM, Hard Disk Controller, and/or Video Card) then additional complications may arise because much of the saved state information may no longer apply to the new system configuration. For example, if a system fails and the data and files are restored to a non-identical system, many hours may have to be spent adjusting and configuring the system to work, using a variety of different programs and utilities. In sum, present system recovery (backup and restore) involves proprietary and custom crafted solutions that are not common and extensible. Instead, providers of backup and restore programs each redefine an environment, process, and syntax to enable the recovery of the system.

As a result, whenever a failure makes a system non-bootable, the process to reconstruct the system's previous state is error prone and lengthy. This can cause serious problems, particularly with computer systems used in critical roles (such as a file server) wherein the time required to get the computer system operational after a failure is very important. The problem is complicated when the hardware of a new system does not precisely match the hardware of the failed system.

SUMMARY OF THE INVENTION

Briefly, the present invention provides a method and system for recording hardware state during a backup process, and restoring from that hardware state during a restore process while handling any differences in state between the recorded configuration and the new system configuration. To this end, the method and system provide rules for handling the differences through selective merging, arranging, and replacement of data, with the logic and work performed transparently to the user.

Hardware state is described using a text file created for the backup, and includes hard disk configuration information, the location (partition) of the operating system, devices installed on the system and any additional drivers to load. When restored, for hardware that is identical, the hardware state is restored as specified in the file. If the hardware state is not identical, then a set of algorithms and rules are used to restore the hardware state. For example, when restoring a hard disk configuration to different size or number of hard disks, disk mirror pairs are restored first, but not to a single spindle and not if they prevent the restore, and partitions are restored from largest to smallest. Further, using the detection code that is used during an initial setup of the operating system, the Automated System Recovery (ASR) of the present invention also detects any changed devices, writes information therefor to the system registry and installs any drivers and support for those devices. Devices that are required to restore the system (critical devices) that differ from what is stored in backed up state with respect to what is detected are merged (substituted) during the restore process to the extent possible. New or different non-critical devices are preserved in the registry during the restore process for future use, e.g., for restoring data with the device after the next reboot. If the device detected by ASR and contained on the backup are the same, but use a different driver or support information, then the updated driver and support information for the device are installed, and the ASR information is overwritten.

Other advantages will become apparent from the following detailed description when taken in conjunction with the drawings, in which:

BRIEF DESCRIPTION OF THE DRAWINGS

FIGS. 4A–4C comprise a representation of a file for storing system state information;

FIG. 9 is a diagram representing a disk configuration recorded for a failed system that has been adapted to a new system in accordance with an aspect of the present invention;

FIG. 10 is a diagram representing a disk configuration including a mirrored hard disk recorded for a failed system that has been adapted to a new configuration in accordance with an aspect of the present invention;

FIG. 12 is a flow diagram generally representing a process for handling hardware differences between a saved system and a new system in accordance with an aspect of the present invention.

DETAILED DESCRIPTION OF THE PREFERRED EMBODIMENT

Exemplary Operating Environment

Figure 1:
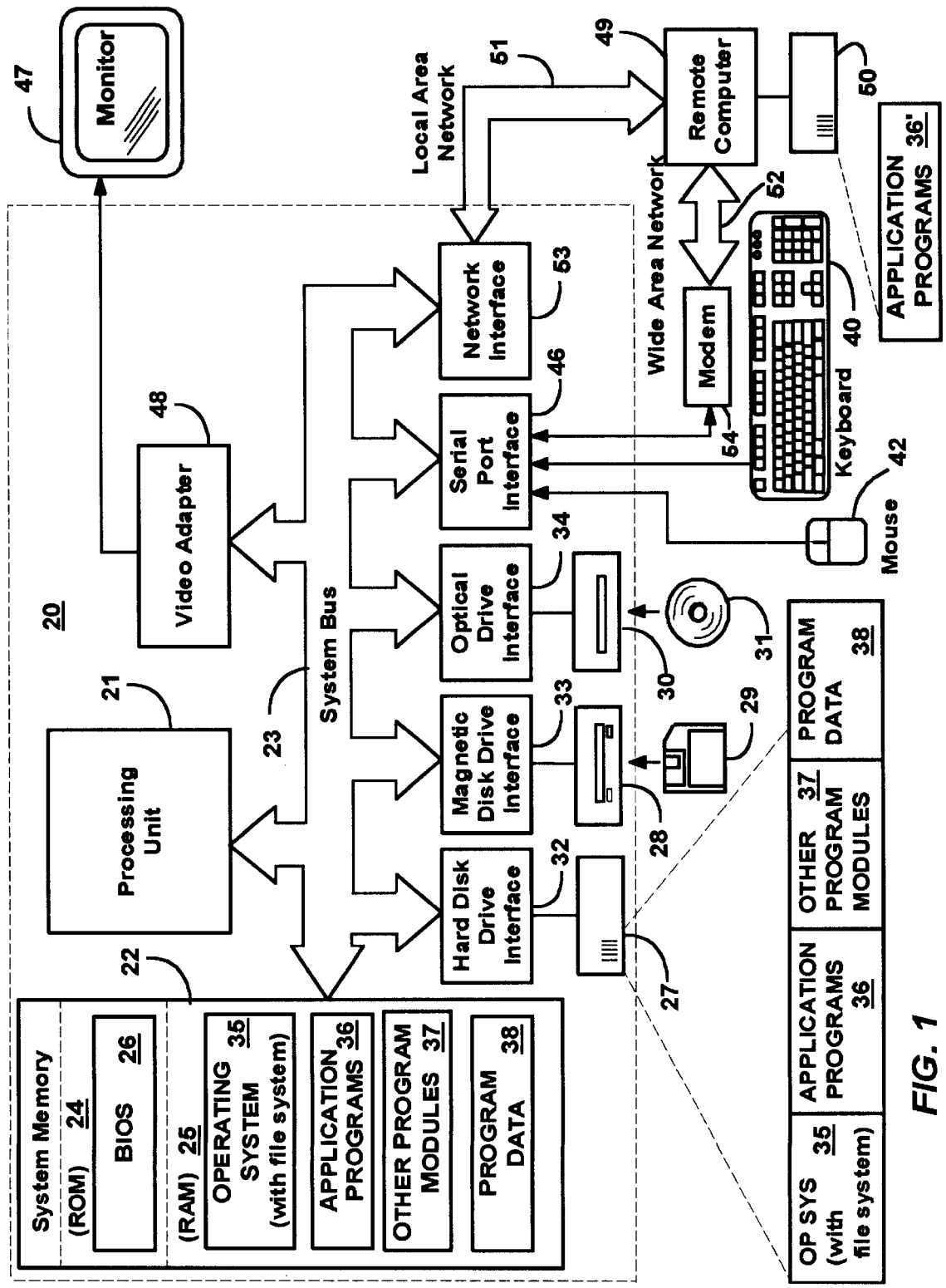
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows 2000), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Backup of System State

The present invention is directed to restoring hardware state on a system that is not identical to a failed system. As such, the present invention may be incorporated into a system backup and restore process referred to as Automated System Recovery (ASR), an integrated mechanism for the backup and restoration of system state. The ASR mechanism provides a single coherent and structured mechanism for backing up and restoring system state. The ASR mechanism is further described in the copending United States Patent Application entitled, "Automated System Recovery via Backup and Restoration of System State," assigned to the assignee of the present invention, filed concurrently herewith, and hereby incorporated by reference in its entirety.

Also described herein is a system recovery framework for backup and restore that provides an extensibility mechanism, such as for third-party vendors to integrate into backup and restore programs. This framework defines a common process, environment, and syntax that allow vendors to easily integrate their programs into the system recovery process. As will be understood, authors of backup and restore applications may thus focus on the backup and restore features of their product, rather than dealing with creating environments or processes to run their programs. The system recovery framework is further described in the copending United States Patent Application entitled, "Extensible System Recovery Architecture," assigned to the assignee of the present invention, filed concurrently herewith, and hereby incorporated by reference in its entirety.

Figure 2:
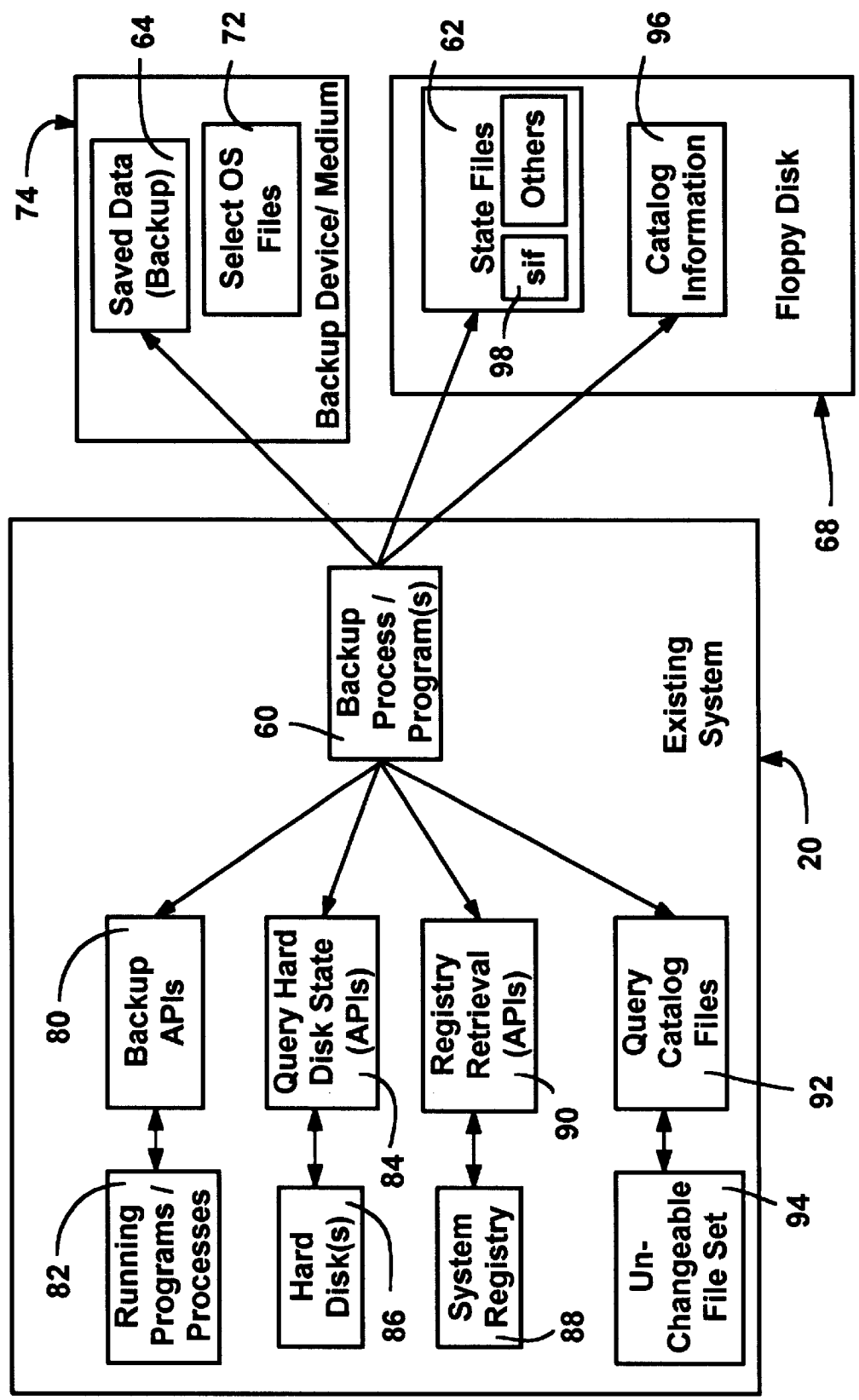
FIG. 2 is a block diagram representing exemplary components for backing up system state and other system information.

Turning to FIG. 2 of the drawings, there is shown a backup component including a backup program (process) 60 for providing an integrated mechanism for determining and storing state information 62. As described below, the state information 62 is later used for restoring a system (e.g., the system 20) after a failure in which the system 20 cannot reboot. Note that the restored system may be an entirely new system, the same system with the same components, (e.g., the boot volume or system volume inadvertently changed, preventing reboot), or essentially the same system but with one or more new components, (e.g., a new hard disk controller was substituted). In any event, the state is saved such that the failed system may be restored to an operational system, and thus the present invention comprises two primary components, one for backup, and one for restore.

As shown in FIG. 2, in addition to backing up the file data 64 normally backed up, e.g., the application programs 66 (FIG. 3) and/or data files 67, the backup program/process 60 of the present invention records the system state 62. To this end, the backup component (e.g., via the backup program 60) copies and stores the state that intrinsically defines the computer system 20 for potential and future recovery, in various areas. Note that the backup program 60 is ordinarily executed on a regular (maintenance) basis by an administrator or the like, and also should be run whenever the system configuration changes, e.g., a new hard disk is added.

In keeping with the present invention, a first area for backing up includes the system state, which is an underlying description of the system, separate from the actual operating system and data files, i.e., the information that intrinsically defines the configuration of a computer system. The system state includes the hard disk configuration (i.e., disk structure and layout) such as the number of hard disks on the system, number of disk partitions on the system and partition format types (such as NTFS, FAT, or FAT32). The hard disk configuration also includes descriptions of where the partitions start and stop on the disk (partition offsets), so that the disk or disks can be recreated exactly during the restore phase. Also stored is the location of the operating system partition or partitions required to start a machine, e.g., where the Windows® 2000 boot volumes and system volumes are installed. These partitions are identified so the proper associations with them can be restored. Also, in the event that the partitions and disks are different during the restore phase, these boot and system partitions will be restored as first priority. Of course, if some storage mechanism other than a hard disk is used, equivalent data will be maintained therefor.

Figure 3:
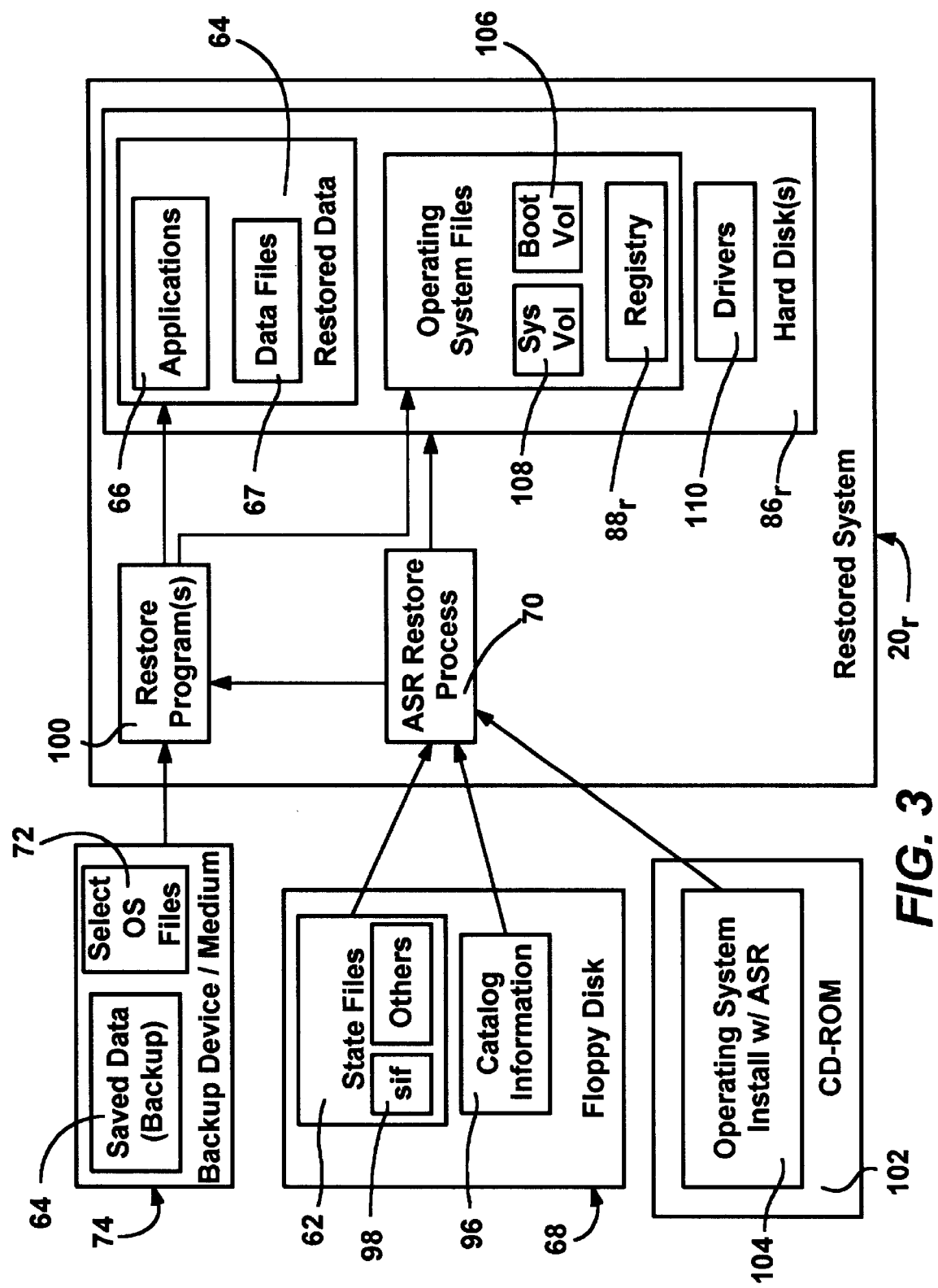
FIG. 3 is a block diagram representing exemplary components for restoring system state and other system information.
Figure 5:
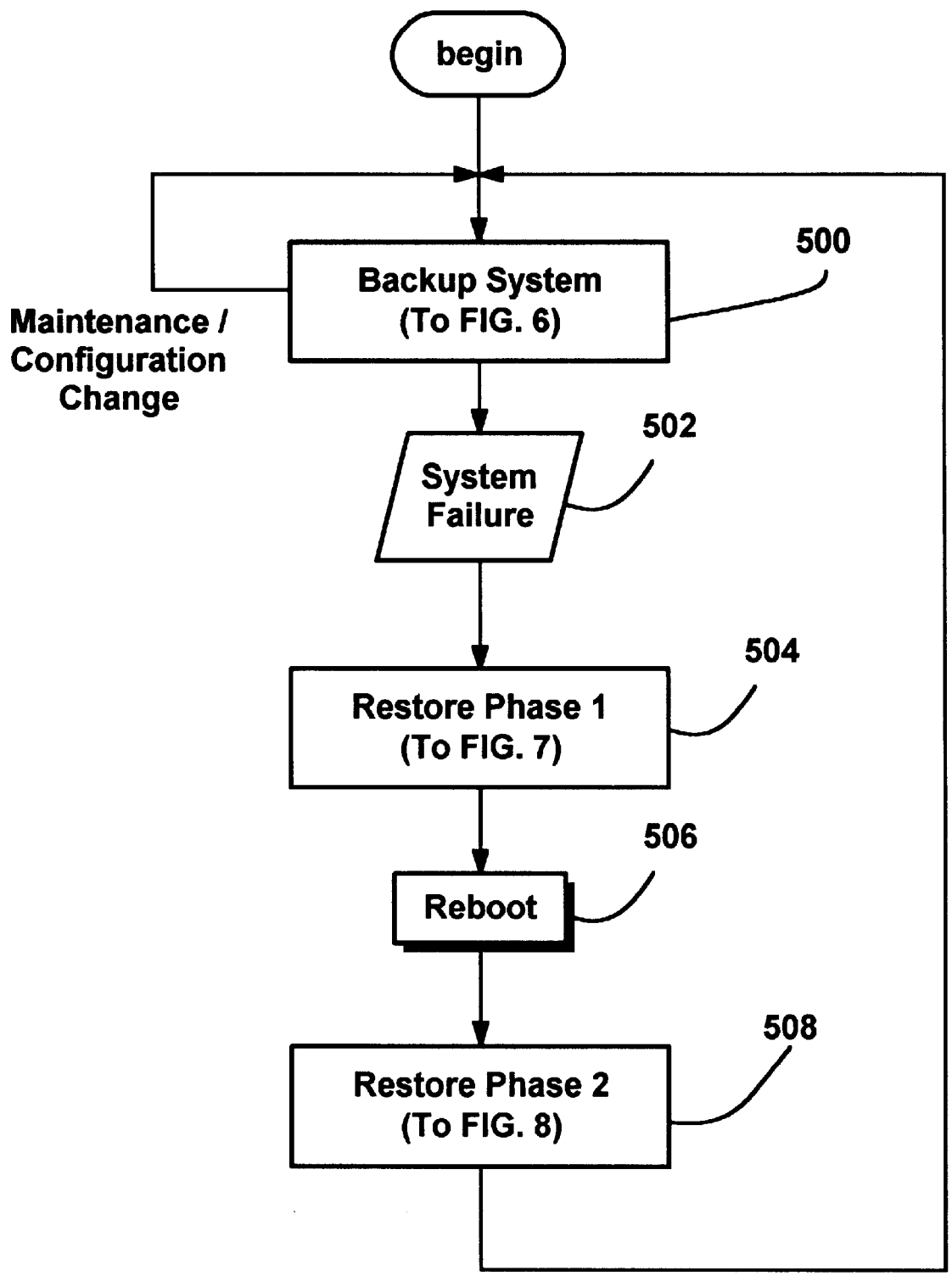
FIG. 5 is a flow diagram generally representing an overall process for backing up and restoring a system.

As will be described below, the system state 62 is recorded on a medium (e.g., a floppy disk 68) that is readily accessible to (i.e., readable by) a newly operational, but not yet restored machine. As used herein, the readily-readable medium will be described as a floppy disk 68, but as can be readily appreciated, the medium may alternatively comprise a read-writeable CD-ROM, network storage (e.g., in a directory of files), flash memory card, wired or wireless telephone connection, smart card and virtually anything else capable of recording and/or transmitting information to a computer system for use by a restore process 70 (FIG. 3). Note that the computer system need not be fully configured for operation at that time, e.g., the hard disks thereof need not be formatted, nor all the various device drivers loaded when the medium 68 is access for restore. Part of the system state, e.g., certain selected, less-essential operating system files, may also be stored to a secondary backup device 74 (e.g., a tape drive or hard disk, such as a network disk drive) that generally stores relatively larger amounts of information. Similarly, as described hereinafter, the backup device 74 will be primarily described as a tape drive, however any medium capable of storing the appropriate amount of information may be used, including a hard disk drive or even the same readily-accessible medium 68 that stores the primary system state information. For example, a single two-gigabyte optical disk may store all of the necessary state information and data for a low-end system.

Thus, a second area to be backed up includes the operating system 72 and data files 64, e.g., the files on the computer and their associated properties including a complete set of the operating system files. As described above, this generally larger amount of data is ordinarily written to the backup device 74, e.g., a tape drive.

A third area to be backed up includes a description of the operating system and data files, e.g., the files on the computer and their associated properties, including a complete set of the recovery information, and a list of what programs should be executed during the restore phases along with other information needed for the restore. More particularly, backing up this area includes specifying the programs to copy and execute on restore, any error handling, and any special driver files to load. For example, if the system has devices that require special drivers or support, information about these drivers can be stored on the floppy disk 68 so that these drivers will be loaded during the restore phase. Thus, if the backup device 74 has a special driver, that driver is identified in this area. The actual driver code file may be recorded on the floppy disk 68, the backup device 74, or on some combination of both, however as can be appreciated, if a special driver is needed for accessing the backup device 74, it will be written to the floppy disk 68 rather than to the backup device 74.

To collect the information, the backup program 60 calls a number of well-documented APIs (application programming interfaces), and performs other operations as described below. As a result, any backup program can integrate with the present invention framework as long as the backup program collects and writes the required information to be used during system recovery.

A first set of information is collected via a Backup() API 80 that provides a set of common and well-documented functionality to collect information and state on a running system. This API 80, the Backup Read () API (and similarly the Backup Write () API) handles some of the collection of information on programs and processes 82 that are in use and whose state is changing.

A second operation performed by the backup program 60 is to query the system for the hard disk state, i.e., the disk geometry. To this end, common, documented APIs 84 exist (publicly available in the Software Development Kit and/or Device Driver Kit from Microsoft® Corporation, Redmond, Wash.) and are provided to determine the number of partitions and volumes on one or more hard disks 86 connected to the system. These APIs 84 also provide information on partition types, formats, labels, and offsets, e.g., where the partitions are located on the disk, where the boot volume and system volume are located and so on. For example, a partition table may be constructed that identifies the number of sectors, which sectors are in which partition, which and where various volume managers are used, and so on. As described below, this information is saved with the state files 62 in a special "sif" (System Information File) format.

A third operation performed by the backup program 60 is to collect system registry 88 information, again via common (NT Registry) APIs 90. As is well-known, the system registry 88 essentially comprises a database of properties, settings and other information used by the operating system and applications at various times to perform various functions. For example, the registry 88 includes information on specific devices and drivers installed on this system, such as the hard disk controller and audio card. Via this set of common APIs 90 and conventions for retrieving the data stored in the registry 88, the saved registry may be recreated and/or adjusted on a restored system.

A fourth operation that the backup program 60 performs is to query the system catalog state via a query component 92. In general, this query component 92 finds and reads the description of the set of files 94 that cannot be modified by any application or system service, and have to be identical to those present in the operating system's CD since its release. Such files may be marked with a file attribute or the like for identification, in accordance with system file protection (SFP) features.

It should be noted that other information may be collected in a similar manner, thereby extending the backup and restore capabilities. For example, one or more functions, such as performed via an API, may obtain network state information, whereby the precise network state may be reconstructed on a restored machine. Video cards, RAM, and other devices on may have state saved therefor in a similar manner, whereby if the a new system has at least the same sizes as the original machine, the original machine may be reconfigured. Also, some programs (such as IIS) have their own database of information. APIs may similarly back up this information on a running system.

Once this information is collected, it is written out to the floppy disk 68 and/or backup device 74 in defined formats to be used by the restore component (FIG. 3). The saved information collected from the Backup APIs 80, and anything else that needs to be restored, e.g., application programs 66 and/or their data 67 (FIG. 3), is written in whatever format the backup/restore programs need and require. The system configuration portion of the state information is written out to in a defined "sif" format, along with additional files, as described below. The catalog information 96 is also written to the floppy disk drive 68.

A preferred format for a sif file 98 written by the backup application 60 is a text file that matches a particular syntax and format. This file comprises a self-contained summary of the system state that specifies, among other things, the hard disk state of the system and the location of key partitions where the operating system (e.g., Windows® 2000) is located. A sif file 98 (FIGS. 4A–4C) also includes instructions specifying which program or programs are to be launched during the restore process, and any commands that need to be run for error handling. The sif file 98 (Dr_state.sif) also identifies any additional drivers or files to copy to assist in the restore process, e.g., a custom driver.

FIGS. 4A–4C represent a sample sif file 98 written out for an exemplary system. Note that FIGS. 4A–4C represent the same sif file 98, however the file spans three drawing figures to assist in readability. Further, note that in FIGS. 4A–4C, the "~~~" characters in the text indicate where part of a data string was omitted to better fit the text horizontally, and also that some of the strings as shown occupy two lines even though there is no hard return at the end of the first of those lines. In any event, as shown in FIGS. 4A–4C, the sif file 98 comprises a data structure including fields of data, arranged as version information, commands, disk information, partition information, volume information and so on. Of course, the sif data structure may be divided into a plurality of files, e.g., one file for the disk information and another for the commands, and so on.

When later interpreted by a restore process 70 (FIG. 3), the sif file 98 will be used to reconstruct the state of the machine prior to failure. Note that the sif file 98 stores information such as the size of the disk, whether the volume was mirrored, striped, the volume managers used and other pieces of information that enable the disk state to be rebuilt on another system. Also, some manufacturers reserve a partition on the disk which may need to be read sector by sector to preserve it for later preservation, and although this data is ordinarily not stored in the sif file 98, the sif file 98 may include the information as to how to restore it.

Also written out by the backup program is the catalog 96 that comprises an enumeration of the required system files that need to be present in the system, and that cannot be altered. This ensures that the appropriate files will be available for the new system configuration. When the above tasks are finished, the system information has been recorded to one or more suitable backup devices. At this time, the recorded information can be used to recover a system.

Restoration Of System State

As described above, a second, restore component of the present invention is directed to restoring the system state after a failure. This second, restore component of the Automated System Recovery (ASR) process includes two phases, whereby each phase ensures that the right data and configuration is restored properly and in the correct order. The ASR framework/mechanism provides a simple and a fast solution to the problem of restoring a system after failure by executing a set of documented and defined operations to restore the system. The information provided by the backup program (or programs) 60 will be used to restore the system.

The extensible framework for restore is generally shown in FIG. 3, wherein a restore process 70 is run in the event of failure to restore a system from recorded backup information. As generally represented in FIG. 3, a first phase of the restore process includes running the operating system setup CD 102 to start Automated System Recovery (ASR) 104. Running the operating system CD 102 loads the necessary drivers and information to view and access critical parts of the computer such as the hard disks. Of course, some mechanism (i.e., the system ROM) also enables the CD-ROM, and/or floppy disk drive to be initially accessed so that the setup CD 102 may be initially run. The use of a setup CD 102 to install an operating system on an operational machine is well known, and thus will not be described in detail hereinafter except to mention that ASR may be integrated with the operating system startup CD 102 in a straightforward manner. This integration provides a standard point for starting the restoration of the system.

During the setup process, the system operator is given an opportunity to select and run ASR 104. When selected, ASR 104 prompts the operator for the floppy disk 68 (or other medium) that includes the information saved during the backup phase. The sif file 98 thus may guide various aspects of the setup process.

In a first phase of recovery, ASR runs the restore process 70 to read the sif file 98 in order to compare and restore the underlying disk state of the system, with respect to disk partitions, layout, and offsets as specified in the sif file 98. For example, the restore process 70 scans the disk partition or partitions and volume or volumes, using the information saved in the sif file 98 to compare the current state of the disk partitions and volumes on the new system with the former system. If there are any differences, the disk and volume state are restored according to the saved information, e.g., the disk 86r (where subscript "r" indicates the restored counterpart to the former system) is appropriately partitioned and the appropriate volumes set up. The partitioning of disks and creation of volumes is well known, and is thus not described in detail herein for purposes of simplicity. Note that if the disks and the volumes existing on the system are not identical to the original disks and volumes that were present when the backup was made, the volume and disk information is adjusted and restored to the best possible extent. For example, if the former system had two partitions, each on separate four-gigabyte disks, equivalent partitions may be established on a portion of a fourteen-gigabyte disk of a newly configured system. The adjusting for such differences is described below with respect to FIGS. 9–12.

Once the underlying system state is restored, an environment is created so that the operating system files and data files 68 described above may be restored. To this end, a restore environment is created by copying the files that are required to run the programs that will restore the remainder of the files. More particularly, the set of files required to start a graphical user interface (GUI) environment that will let the restore program or programs 100 (written for the Windows 32-bit platform run and execute) are copied to the boot volume 106 and system volume 108, i.e., at least the core operating system files are copied. Note that these files may be on the same volume. Also, the restore application program 100 is copied to the hard disk (unless already present on an intact volume). The registry 88r may also be copied at this time. Once these files are copied, the system is restarted.

After the files are copied and the reboot occurs, the next phase begins by initializing the environment. Initializing involves re-detecting any new devices that have been attached to the system, and installing any needed drivers 110 or files used by the restore program or programs 110. The automatic detection of hardware and/or installation of corresponding software by an operating system is well known, (e.g., plug and play technology) and is thus not described herein in detail. Note that at this time, the system catalog 96 has also been accessed, and is used to prevent the restoration of a different version of any of the files that are identified in the catalog 96.

To further configure the environment for the programs, ASR (via the operating system) thus detects and installs drivers 110 and support for devices installed on the system. This ensures that devices (such as a tape drive) are available for the restore program 100. These drivers and support for these drivers are normally loaded from the operating system CD, however as described above, any specialized drivers and support therefor that may have been present were saved as part of the backup process to ensure their availability, and thus may be loaded from the floppy disk 68 or the like. Any changed information is recorded in the registry $88_r$.

After the environment is configured, the restore program or programs 110 are run according to the instructions that were saved in the sif file 98 during the backup process. This will usually result in restoring the operating system and data files from the backup device 74. In the event of an error condition, the instructions specified will be executed. Note that during restoration, if a volume is found intact, that volume is not restored, potentially saving considerable time. For example, it is possible that only the boot volume was damaged, whereby only the boot volume 106 need be restored to restore the system. In any event, after restoring the data files, the system $20_r$ is then restarted, after which the restoration and recovery is complete.

Figure 6:
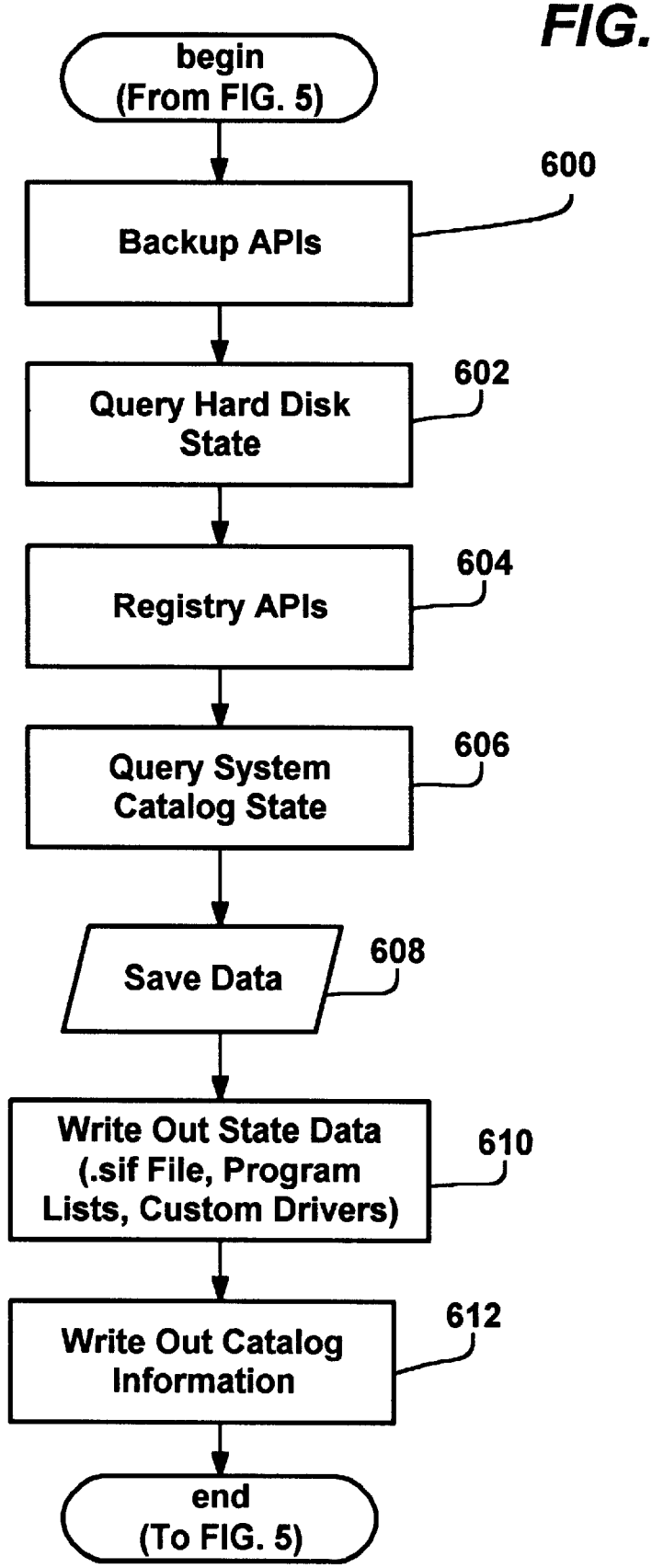
FIG. 6 is a flow diagram generally representing a process for backing up system state and other system information.
Figure 7:
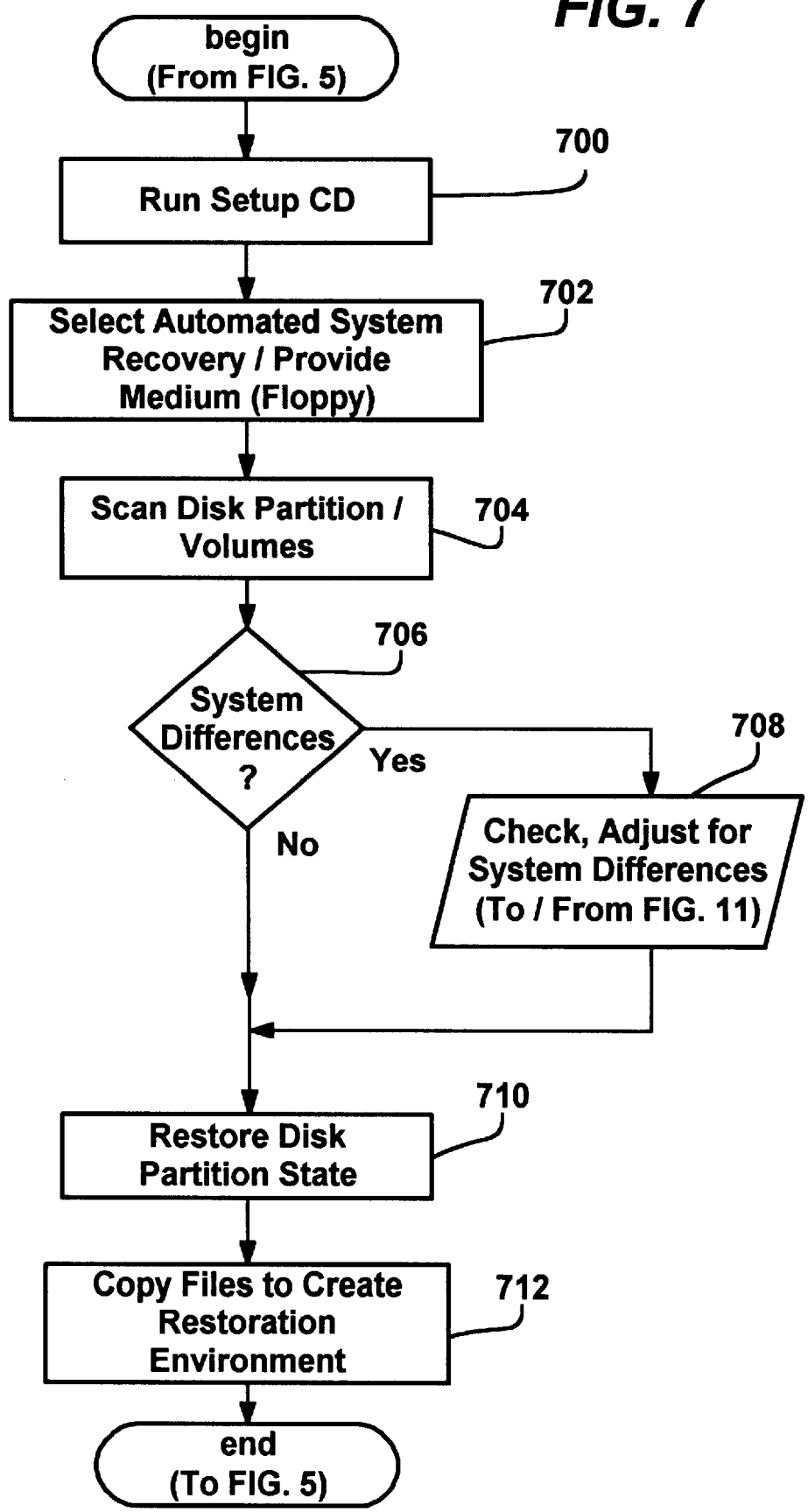
FIG. 7 is a flow diagram generally representing a process for restoring system state information in a first phase.

The backup and restore processes will now be summarized with respect to the flow diagrams of FIGS. 5–8. First, as represented at step 500 of FIG. 5, the system is backed up during regular maintenance, or whenever a configuration change is made, for example, if new hardware is installed. To this end, as shown in FIG. 6, the Backup () APIs 80 are called (step 500), the hard disk state is queried (step 602), the registry APIs 90 are called (step 604) to read the system registry 88, and the system catalog state is queried to catalog those files that are not allowed to change.

Step 608 represents the writing out of the file and other data (collected at step 600) to be backed up by the backup program 60 according to its desired format. In keeping with the present invention, at step 610, the state data collected via steps 602–604 is written out to the floppy disk 68, including the sif file 98, the list of programs and commands needed for restoration, and any custom drivers. Lastly, step 612 represents the writing out of the catalog information 96 gathered by step 606. Note that these steps need not be performed in the order shown in FIG. 6. For example, the various pieces of information may be recorded as soon as each piece is collected, rather than first collecting the information before performing any writing.

Returning to FIG. 5, sometime after a backup at step 500, the system may fail (step 502) in a manner in which it cannot be rebooted. At this time, restoration via the backed up state information 62 is desired. Whether restoring to an entirely new system, a repaired system or the same system, the restore process 70 begins its first phase at step 504 when the operator runs an appropriate setup CD 102 (step 700). During execution of the setup, when prompted, the operator selects automated system recovery 104, and inserts the floppy disk 68 (or otherwise provides the system with the backup medium) at step 702.

As represented by step 704, the ASR mechanism (restore process 70) of the present invention next scans the disk partitions, volumes and so forth of the current system to compare with the state information stored for the previous system in the sif file 98 on the floppy disk 68. As described above, any system (hard disk) differences are detected at step 706, and adjusted for at step 708 (and FIG. 11). The handling of such differences with respect to disks is described below with reference to FIGS. 9–11.

At step 710, the disk partition state is restored, for example, to establish the boot volume 106 and/or system volume 108 at their appropriate locations on the disk 86r. Then, as described above, the files needed for providing a restoration environment (e.g., to run Win32 applications) are copied from the floppy disk 68 to the hard disk at step 712.

Figure 8:
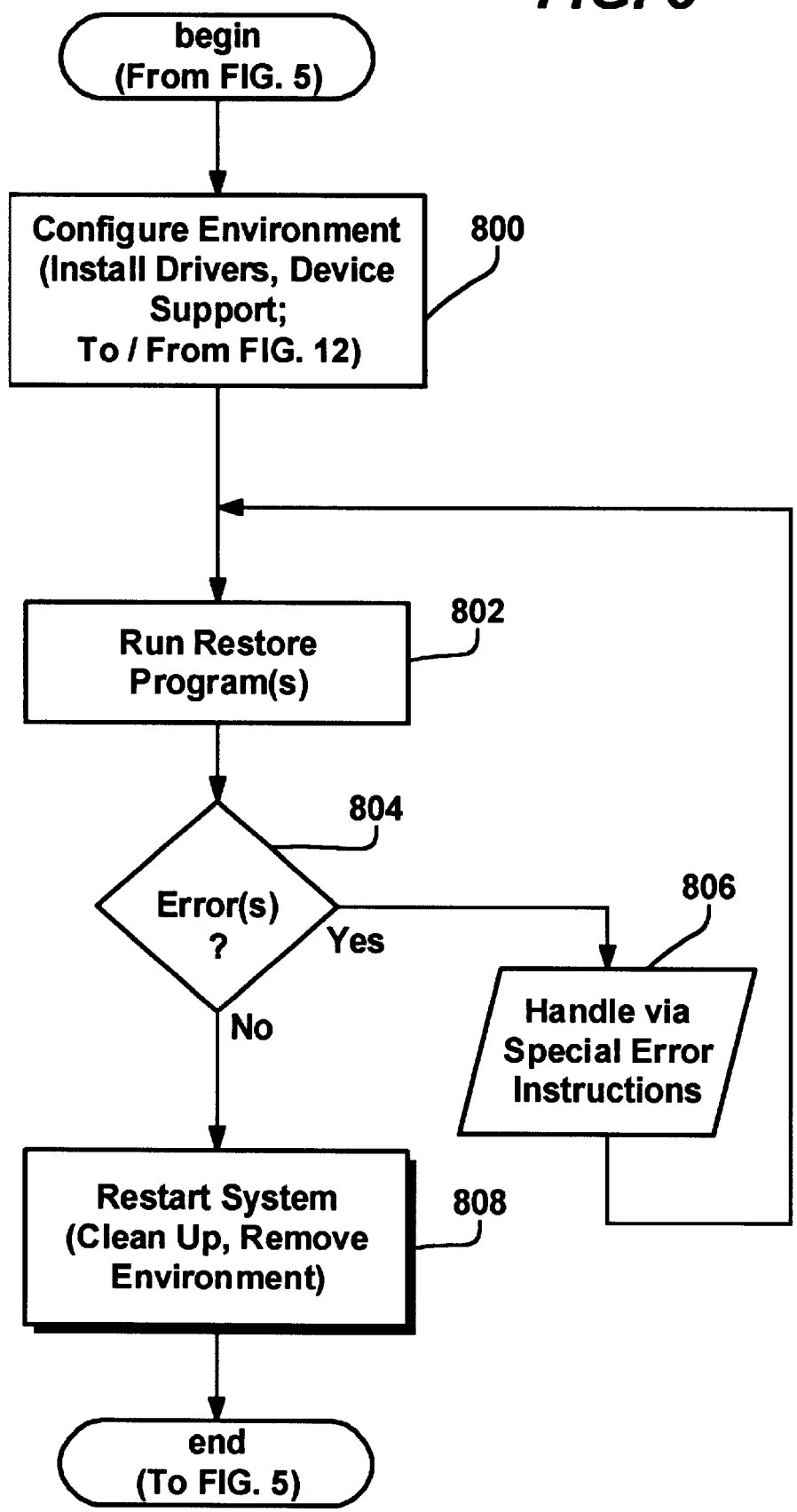
FIG. 8 is a flow diagram generally representing a process for restoring system state information and other system data in a second phase.

Returning to FIG. 5, at step 506, the system is rebooted, after which the system is ready for the second phase of restoration, as generally represented via step 508 and in the steps of FIG. 8. At step 800 of FIG. 8, the restoration environment is configured by installing device drivers 110, device support and so on, particularly for any devices needed by the restore program 100. For example, at this time, a device driver for the tape drive on which the rest of the backed up data is installed. If any differences in hardware are detected, they are handled as generally represented in FIG. 12, described below.

Step 802 represents the running of the restore application program 100 that is the counterpart of the program used to back up the operating system files 72, applications 66 and data 67. If any errors are detected at step 804, step 806 is executed to handle the error, including executing any special error handling instructions that were saved during backup. Lastly, when restoration is complete, the system is restarted to clean up and remove the restoration environment, as represented by step 808. When restarted, the restoration and recovery is complete. Note that in addition to recovery, the backup and restore process also may be used for replication of systems.

Non-identical Systems

When restoring a system, it is a frequent occurrence that a new system or hardware will be different from that of the previous system. For example, if a hard disk fails, a replacement hard disk is likely to be larger in capacity since technological improvements tend to rapidly increase the amount of storage readily available for a replacement. This occurrence is similar for other hardware devices, e.g., video cards have increasing amounts of memory, DVD-ROM drives (which can read CD-ROMs) are replacing CD-ROM drives, and so forth. Of course, it is also possible that a system operator may decrease the size of a device, and/or also may try to save slots, such as by configuring a new system with a lesser amount of disks. When dealing with disk drives, it is thus possible to restore to a larger disk, restore to a disk set with fewer spindles, restore to a disk set with more spindles or restore to a smaller disk. It is also possible to have two or more disks on separate buses in an original machine configuration replaced with two or more disks on the same bus, which, although performance may be reduced, may be reconstructed.

FIG. 9 shows one possible example wherein three drives labeled (c), (d) and (e) are two gigabytes, four gigabytes and two gigabytes in size, respectively. As can be readily appreciated, ignoring overhead, when restored, the three drives may be combined on a single eight-gigabyte drive or larger. For example, drive (f) is fourteen gigabytes, partitioned into three partitions for (c), (d) and (e), with six gigabytes of additional space available for other partitions, preferably used by extending the last partition (e) to eight gigabytes. Note that the extra space may be alternatively added to any combination of partitions (c), (d) or (e), for example, two gigabytes to each partition instead of six gigabytes to partition (e), and indeed, the administrator may be prompted in this situation to make a choice. Further, note that the file system needs to be informed that it now has the extra storage so that it can adapt thereto and use it.

When dealing with simple (e.g., non-mirrored) partitions and a new larger disk, it is thus often a relatively straight-forward calculation to combine the partitions into one or more larger drives. However, the process may become complicated when the number of original partitions is larger but not all of the new space can be divided into partitions larger than the previous space. For example, in the original configuration of FIG. 9, three, three-gigabyte drives would clearly not suffice in a new system, for although their total space of nine-gigabytes is larger than the eight needed, the four-gigabyte partition would not fit on any one spindle. As can be readily appreciated, it can become a highly complex problem to map a large number of former system drives (e.g., thirty) to a lesser (or even larger) number of drives wherein the sizes of the new drives do not fit each of the original drives. Thus, a general rule that may be used is to take the original set of drives, and working from largest original drive to smallest, look for a drive/partition that best matches. If one is not found, a larger drive is partitioned (mathematically, not actually at this time) to match. The process may be repeated iteratively if some space still needs to be reconstructed and some free space remains, e.g., try again with some difference, such as partition a new ten-gigabyte drive rather than the new twelve-gigabyte drive for restoring an eight gigabyte-drive, whereby two six-gigabyte original drives will now fit.

Moreover, the process may get even more complicated when dealing with mirrored drives, RAID and the like. For example, if drives (c) and (e) of FIG. 9 were a mirror pair, placing both those drives on a single drive (spindle) would significantly impair performance since each write to one would be written to the other, with considerable seeking taking place to accomplish each write. Further, this would defeat the reliability assurances provided by the mirroring. Thus, mirrored drives need to be separated to different disks in the new system. If this is not possible, then the mirroring is not performed, and the operator informed of the inability to mirror the disks.

Similarly, even if multiple, larger disks are provided, mirroring may not be possible on a restored system. For example, as shown in FIG. 10, the six-gigabyte mirrored disks (g1) and (g2) cannot be restored in new twelve-gigabyte system disks (i) and (j), because doing so would not leave room for the eight-gigabyte disk (h) on either disk (i) or (j). In this instance, the system may be restored, but only without one of the two mirrored disks, e.g., disk (f2) would not be restored.

Thus, another general rule is that if mirrored disks are present, those disks are handled first, by assigning them to new disks of the system. If the remaining disks do not fit, then one of the mirrors (e.g., on from the smallest set) is not restored, and the process retried until the other disks fit on the new system. It should be noted that in order to (partially) restore a system, only the boot and system volumes actually need to be restored, as the administrator may be prompted after reboot to add storage for the complete restoration of data.

Figure 11:
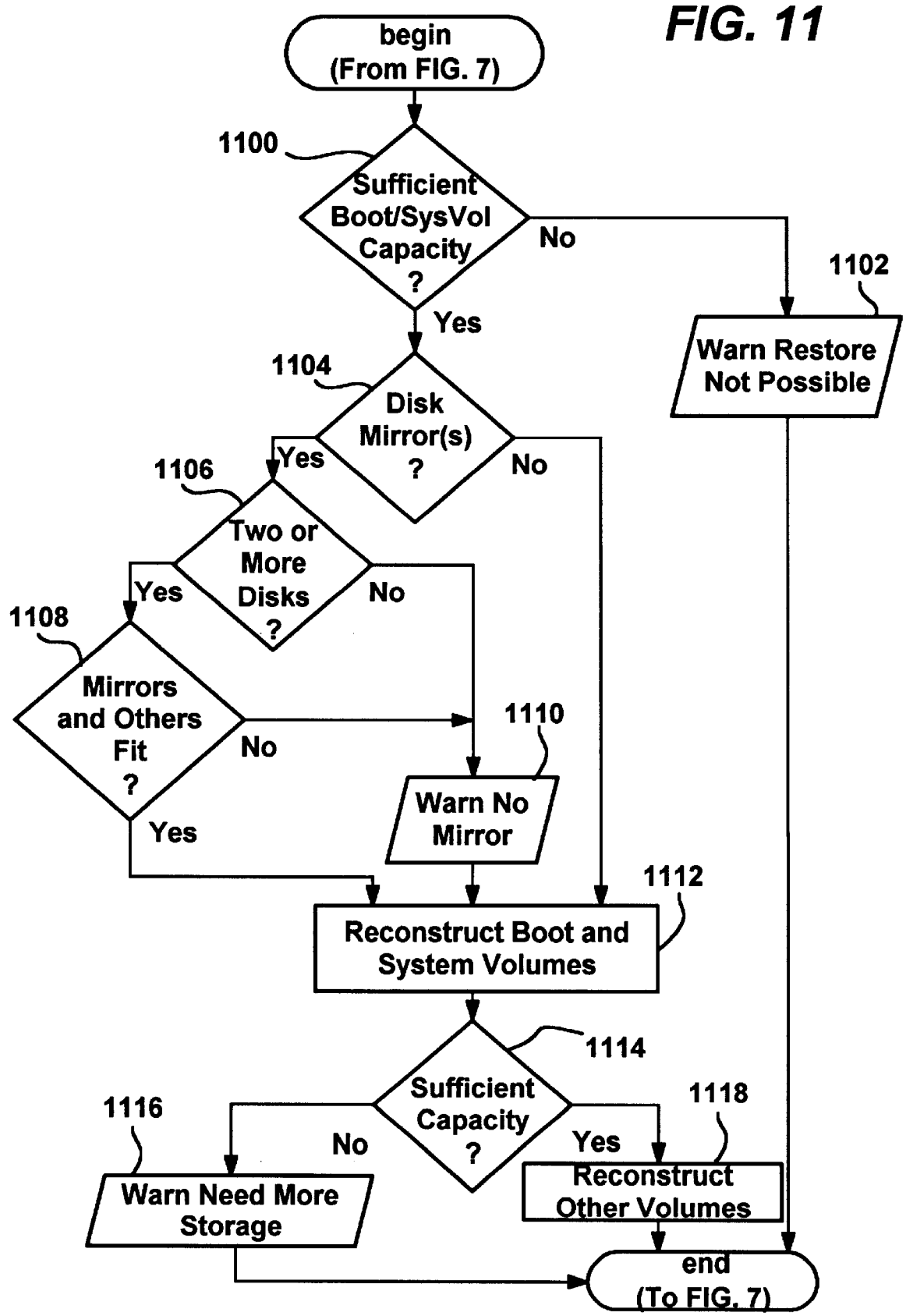
FIG. 11 is a flow diagram generally representing a process for determining whether a saved disk configuration may be implemented on a new disk configuration in accordance with an aspect of the present invention.

In accordance with one aspect of the present invention, FIG. 11 shows one way in which disk differences may be handled according to established rules. First, at step 1100, it is determined whether there is sufficient capacity for both the boot volume 106 and system volume 108 (FIG. 3, which may be the same volume). If not, the restore cannot take place, whereby the operator is informed of this via step 1102 and needs to acquire more capacity to restore the system.

If sufficient storage for at least these disks is available, step 1100 instead branches to step 1104 where the saved configuration in the sif file is evaluated to determine whether disk mirrors are present. If not, step 1104 branches to step 1112 where the boot volume and system volume is reconstructed on a suitable drive using the offset information in the sif file. Then step 1114 mathematically determines whether sufficient capacity is available for restoring the rest of the data, using the general rules described above. If not, step 1116 is executed to inform the operator that more storage is needed, otherwise the process reconfigures the other disks according to the saved information, adding any remaining space to at least one of the partitions or providing a new partition. Note that the operator may be given a chance to select how free space is utilized.

Returning to step 1104, if disk mirrors are specified in the sif file, then step 1104 branches to step 1106 where the new system is evaluated as to whether it has at least two disks. As described above, if only one disk is present in the new system, mirroring is not performed, whereby step 1106 branches to step 1110 to warn the administrator of this situation. Step 1112 is then performed to configure the boot and system volumes, and the process continues through steps 1114 and 1116 or 1118 as described above.

If at step 1106 two or more disks are available, then mirroring is possible. Step 1108 then mathematically determines whether and how the various partitions will fit on the disks of the new system, using the general rules described above. If they do not fit, step 1108 branches to step 1110 to inform the operator as to which one or ones will not be mirrored, possibly letting the administrator select among workable configurations. Steps 1112 to 1114 and either step 1116 or 1118 are then executed as described above. In this manner, the new hard disks are reconfigured to match the configuration stored in the sif file to the extent possible.

It should be noted that one current implementation of the present invention requires that at least the same number of disk drives, of at least the same size, be available on a new system. This guarantees complete restoration, however, as can be appreciated from the above description, is not necessary to the present invention, but is done for simplification.

In addition to disks, other hardware devices may be different in a new system. For example, if the system has changed (e.g., the original was destroyed or damaged) or one or more relatively important devices (e.g., the hard disk controller) have changed since the backup, ASR (the restore process 70) redetects any changed devices and writes them to the system registry 88. Any drivers and support for these devices are also installed as part of the setup. Note that the detection code is the same that is used during an initial setup of an operating system (Windows) and is thus not described in detail herein. Further note that if a special driver was present, then that driver was backed up and is available for ASR to install, as described above.

Following the redetection, the restore process 70 performs a merge with the devices and drivers that were backed up. In general, and as represented in FIG. 12, the logic used during the merge considers critical devices (devices that are required to start the system, backed up in a CriticalDevice-Database or the like) that differ what the backup contains and what ASR has detected.

First, however, a test may be performed at step 1200 to determine whether the new system is identical in hardware devices to the former system, since if so, no device changes need to be handled. If identical, step 1202 is performed to handle any restoration that may be needed (e.g., properties set for the devices), and the process ends.

If differences exist, step 1204 is performed to determine if a critical device is not present on the new system. For example, a floppy drive or CD-ROM may have the sif file thereon, and thus such a device is needed to restore the system. If no critical device is missing, step 1204 branches to step 1212 as described below. However, it is also possible that a critical device is missing, but an adequate substitute is available. For example, different floppy drives may read floppy disks, DVD-ROM drives may read CD-ROMS and so on. Thus, if missing, step 1204 branches to step 1206 to determine if such an adequate substitute exists. If no substitute exists, step 1210 is performed to inform the operator of the inability to restore the system. On the other hand, if an adequate substitute exists, step 1208 merges (substitutes) the hardware by allowing the actual state to be used instead of the state recorded in the sif file. Essentially, this involves preserving the original device information that was saved during the ASR restore, while enabling the use of different devices that ASR might have detected (step 1212). This enables the device to be used following a reboot, e.g., to restore data via that device.

If the device is non-critical to the starting of the system, or a critical device that has been merged, step 1212 preserves any different devices that ASR might have detected. This information is saved in the registry 88. Then, step 1214 is executed, whereby a test is performed to determine whether any device detected by ASR and identified in the backup information are the same, but use a different (e.g., updated) driver or support information. If so, the ASR information is overwritten at step 1216, and at step 1218, the new driver and support information for the device are installed. Similarly, if a new device is detected but was not present on the backup, it is installed.

As can be seen from the foregoing detailed description, there is provided a method and system that enables the backup and restoration of a failed system in an automated and efficient manner, while adjusting for hardware differences to the extent possible. A backup component copies and stores the state that intrinsically defines the configuration of the computer system for potential and future recovery, and a two-phase restoration process uses the backed-up information to restore the system. If any hardware differences are determined, adjustments are automatically made to the extent possible, thereby expediting system recovery.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A method for recovering from a failed computer system, comprising:

reading, at a new computer system, saved state information of the failed computer system;

detecting as part of an automated restore operation at least one state difference between the new computer system and the failed computer system; and configuring the new computer system based on state information of the failed computer system and a set of rules for handling differences, the set of rules accessed during the automated restore operation so as to configure the new computer system in a substantially transparent manner based on the saved state information, each state difference and the set of rules.

2. The method of claim 1 wherein detecting at least one state difference includes detecting a difference in a number of disk drives on the new system relative to the failed system.

3. The method of claim 1 wherein detecting at least one state difference includes detecting a difference in a size of at least one disk drive on the new system relative to the failed system.

4. The method of claim 1 wherein detecting at least one state difference includes detecting at least one new hardware device on the new system relative to the failed system.

5. The method of claim 4 wherein the saved state information indicates that non-critical hardware changed on the new system relative to the failed system, and further comprising, preserving the non-critical hardware for use in the new system.

6. The method of claim 4 wherein the saved state information indicates that a critical device is missing on the new system relative to the failed system, and further comprising, merging new hardware device information with saved state information for the critical device.

7. The method of claim 6 further comprising locating substitute hardware on the new system for merging with the critical device that is missing.

8. The method of claim 1 wherein detecting at least one state difference between the new computer system and the failed computer system includes detecting a different device driver or support for a hardware device, and further comprising, loading the different device driver or support.

9. The method of claim 1 wherein detecting at least one state difference includes, detecting from the state information a plurality of disks on the failed system, detecting a lesser number of disks on the new system, and wherein configuring the new computer system based on state information of the failed computer system and a set of rules for handling differences therebetween includes restoring at least two disk partitions of the failed system to a single disk of the new system.

10. The method of claim 1 wherein detecting at least one state difference includes, detecting from the state information a mirrored disk set on the failed system, detecting a single disk on the new system, and wherein configuring the new computer system based on state information of the failed computer system and a set of rules for handling differences therebetween includes restoring only one disk partition of the mirror set to the single disk of the new system.

11. The method of claim 1 wherein detecting at least one state difference includes, detecting from the state information a mirrored disk set on the failed system, evaluating the amount of available disk space on the new system, and if the space is not sufficient, restoring only one disk partition of the mirror set to a disk of the new system.

12. The method of claim 1 wherein detecting at least one state difference includes, detecting from the state information a lesser amount of disk space on the new system, and wherein configuring the new computer system based on state information of the failed computer system and a set of rules for handling differences therebetween includes, restoring the system volume and boot volume to a disk of the new system.

13. The method of claim 1 further comprising, restoring data backed up from the failed system to the new system.

14. The method of claim 1 further comprising, restoring at least one driver backed up from the failed system to the new system.

15. A computer-readable medium having computer executable instructions for performing the method of claim 1.

16. A system for recovering from a failed computer device, comprising:
 a new computer device having at least one hardware-related difference from the failed computer device;
 a medium having stored thereon saved state information of the failed computer device;
 a detection process for detecting the at least one hardware-related difference; and
 a restore process operatively connected to the detection process of the new computer device, the restore process reading the medium and configuring the new computer device based on the state information and a set of rules for handling the at least one hardware-related difference.

17. The system of claim 16 wherein at least one hardware-related difference corresponds to a different number of disk drives relative to the failed device.

18. The system of claim 16 wherein at least one hardware-related difference corresponds to at least one disk drive that is a different size from each disk of the failed device.

19. The system of claim 16 wherein at least one hardware-related difference corresponds to at least one new hardware device relative to the failed device.

20. The system of claim 19 wherein the restore process determines via the detection process and the saved state information that non-critical hardware is changed on the new device relative to the failed device, and wherein the restore process preserves the non-critical hardware for use in the new device based on the set of rules.

21. The system of claim 19 wherein the restore process determines via the detection process and the saved state information that critical hardware is changed on the new device relative to the failed device, and wherein the restore process locates substitute critical hardware for use in the new device based on the set of rules.

22. The system of claim 16 wherein at least one hardware-related difference corresponds to at least one different device driver relative to the failed device.

23. The system of claim 22 wherein the restore process installs the different device driver to the new device.

24. The system of claim 16 wherein the new device includes a lesser number of disks on the new system relative to the failed system, and wherein the restore process configures at least two disk partitions corresponding to the failed system to a single disk of the new system based on the set of rules.

25. The system of claim 16 wherein the new system includes a single disk and the saved state information indicates that the failed system had a mirrored disk set, and wherein the restore process configures only one disk partition of the mirror set on the single disk of the new system based on the set of rules.

26. The system of claim 16 wherein the saved state information indicates that the failed system had a mirrored disk set, and wherein the restore process evaluates the amount of available disk space on the new system, and if the space is not sufficient, configures only one disk partition of the mirror set on a disk of the new system based on the set of rules.

27. The system of claim 16 wherein there is insufficient disk space on the new system to restore the failed system, and wherein the restore process determines that sufficient disk space exists on the new system to restore the system volume and boot volume.

28. The system of claim 27 wherein the restore process restores the system volume and boot volume.

29. The system of claim 16 wherein the restore process further restores application data backed up from the failed system to the new system.

30. The system of claim 16 wherein the saved state information includes a specialized driver, and wherein the restore process installs the specialized driver to the new system.

31. A computer-implemented method, comprising:
 reading, at a second computer system, saved state information of a first computer system, the saved state information including hardware device configuration data for a first hardware device of the first computer;
 detecting a difference between the hardware device configuration data of the first computer system and hardware device configuration data of a second hardware device of the second computer system; and
 automatically configuring the hardware device of the second computer system based on an established set of rules that includes information for handling differences between hardware devices.

32. The method of claim 31 wherein the hardware device comprises a storage mechanism.

33. The method of claim 31 wherein the hardware device comprises at least one hard disk drive.

34. A computer-readable medium having computer-executable instructions for performing the method of claim 31.

* * * * *